(12) United States Patent
Spurr et al.

(10) Patent No.: US 8,583,485 B2
(45) Date of Patent: *Nov. 12, 2013

(54) INDIVIDUALIZED MARKETING TO IMPROVE CAPACITY UTILIZATION

(75) Inventors: Charles L. Spurr, Wakefield, MA (US); Jim Giza, Sutton, MA (US); Paul English, Arlington, MA (US); Daniel S. Hafner, Fairfield, CT (US); Andrew Patterson, New York, NY (US); Steve Hafner, Fairfield, CT (US)

(73) Assignee: Kayak Software Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/032,558

(22) Filed: Feb. 22, 2011

(65) Prior Publication Data

US 2011/0145061 A1    Jun. 16, 2011

Related U.S. Application Data

(63) Continuation of application No. 11/087,469, filed on Mar. 23, 2005, now Pat. No. 7,917,387.

(60) Provisional application No. 60/642,324, filed on Jan. 7, 2005.

(51) Int. Cl.
*G06Q 30/00* (2012.01)

(52) U.S. Cl.
USPC .................................................. 705/14.43

(58) Field of Classification Search
USPC ........................................................ 705/14, 10
See application file for complete search history.

(56) References Cited

U.S. PATENT DOCUMENTS

| | | | |
|---|---|---|---|
| 6,993,494 B1* | 1/2006 | Boushy et al. | 705/7.31 |
| 7,904,334 B2 | 3/2011 | Chen et al. | |
| 8,024,447 B1* | 9/2011 | Garcia-Franco et al. | 709/223 |
| 2002/0010686 A1* | 1/2002 | Whitesage | 705/80 |
| 2002/0110085 A1* | 8/2002 | Ho et al. | 370/230 |
| 2003/0115093 A1* | 6/2003 | Lim et al. | 705/10 |
| 2003/0126250 A1* | 7/2003 | Jhanji | 709/223 |
| 2004/0093296 A1* | 5/2004 | Phelan et al. | 705/36 |
| 2005/0278236 A1* | 12/2005 | Adams et al. | 705/35 |
| 2006/0085246 A1* | 4/2006 | Li | 705/10 |

\* cited by examiner

*Primary Examiner* — Matthew L Hamilton
(74) *Attorney, Agent, or Firm* — Wolf, Greenfield & Sacks, P.C.

(57) ABSTRACT

Suppliers of goods and/or services subject to shifts in capacity utilization design and implement marketing campaigns around utilization forecasts, targeting marketing expenditures on periods of excess capacity rather than periods without excess capacity, and in some embodiments also to alter variables such as pricing, consumer targeting, or even the intensity of the campaign itself on a dynamic basis in response to changing market conditions.

20 Claims, 6 Drawing Sheets

FIG. 3

INDIVIDUALIZED MARKETING TO IMPROVE CAPACITY UTILIZATION

CROSS-REFERENCE TO RELATED APPLICATION

This application is a continuation of U.S. application Ser. No. 11/087,469, filed on Mar. 23, 2005, which claims the benefit of U.S. Provisional Application No. 60/642,324, filed on Jan. 7, 2005, the entire disclosure of each is hereby incorporated by reference.

FIELD OF THE EMBODIMENTS

The present invention relates to marketing in business contexts involving inventory that is fixed and perishable, and in particular to dynamic, individualized marketing in such contexts.

BACKGROUND

Airlines, hotels, car rental companies, and other businesses have fixed short-term inventory and low variable costs. For such businesses, capacity utilization is a critical determinant of economic performance. Inventory is defined by units of time (hotels, for example, sell one-night stays for specific nights) and is perishable (if a specific night is not sold, that inventory cannot be recovered). Complex forecasting tools have therefore been developed to help businesses project future demand. Based on such projections, a hotel, for example, can raise prices when excess demand is expected and lower prices in anticipation of surplus capacity. In addition, a hotel can launch marketing campaigns, such as a summer weekend specials, designed to boost sales during low-demand periods. While these marketing efforts may increase sales during specific periods, they have substantial inefficiencies. First, as they are typically planned well in advance, marketing campaigns ordinarily cannot react to actual conditions as they evolve in the marketplace. Second, campaigns are ordinarily broad-based by nature, targeting broad demographic groups rather than individuals with plans or preferences directly relevant to the campaign. Current marketing tools, in other words, do not allow the marketer to identify consumption patterns in advance of marketing communication.

SUMMARY

The present invention allows suppliers of goods and/or services subject to shifts in capacity utilization to design and implement marketing campaigns around utilization forecasts, targeting marketing expenditures on periods of excess capacity rather than periods without excess capacity. The invention is especially well suited to use in conjunction with online interface tools, such as travel sites, that specifically address the target market. Visitors to such a site have, merely by virtue of their visit, identified themselves as potential customers of a supplier such as a hotel, and the information they provide in the ordinary course of interacting with the site can be used to determine the relevance of a promotional campaign to them. In recognition of the fact that multiple suppliers may seek to target a particular consumer (i.e., site visitor) the invention permits suppliers to enter, before their promotional campaigns take effect, bids on consumers fulfilling specified criteria. When a consumer visiting the site is identified as fulfilling the campaign criteria of more than one supplier, the campaign shown to the consumer is selected based on supplier bids and, if desired, other scoring criteria as well. If the site's policies allow more than one campaign at a time to be advanced to the consumer, those associated with higher scores are selected. This approach ensures that limited presentation space is efficiently allocated and that individual marketers retain control over campaign expenditures.

Although it should be understood that the invention has relevance to virtually any business sensitive to utilization of fixed capacity, and can be implemented in any suitable manner, for explanatory purposes the ensuing discussion will focus on hotel stays and implementation of the invention through a travel site. Travel-related suppliers (in this case, hotel proprietors) present their products and services (hereafter "items") via the travel site, placing and updating pictures, descriptions and amenity lists. Using the present invention, they can construct and manage merchandising campaigns, using, for example, the segmentation tools described herein to focus on specific consumers. These campaigns can be displayed on the travel site and those of its affiliate partners or, over time, on other sites that display the travel site's marketing campaigns. Marketers can view and analyze the results of their marketing efforts to determine their effectiveness and make modifications, while the campaign itself can be directly and unobtrusively offered to visitors via the travel site. The campaign provides site visitors with offers of potential interest, and fees can be charged to the campaign organizer on a "per click" basis—i.e., a fixed amount for each marketing placement to a site visitor satisfying the predefined campaign criteria—or any other suitable basis. The campaign organizer may be billed, for example, when the site visitor, responding to the marketing offer, clicks to access the "detail page" a hotel maintains for itself within the travel site.

The present invention allows the marketer to specify a consumption pattern (e.g., the nights that the guest will stay in the hotel) as campaign targeting criteria. Because a travel site typically gathers a customer's consumption preferences (an arrival date, a length of stay, a destination) in the course of providing the very information a visitor seeks, a campaign implemented via such a site begins with a targeted audience. Using the invention, marketers can limit their campaigns to customers whose consumption patterns—gleaned as the consumer interacts with the travel site in the ordinary course of business—fit their projected capacity utilization. Moreover, features of the campaign can shift as the relevant promotional period approaches, depending, in an ongoing manner, on the campaign's success. This facilitates tactical responses to short-term changes in demand and marketing campaigns that isolate periods where capacity is not fully utilized. In some embodiments, a supplier is able to alter variables such as pricing, consumer targeting, or even the intensity of the campaign itself on a dynamic basis in response to changing market conditions. Marketing efforts may, for example, simply cease when a desired level of utilization is reached. The present invention may also permit the supplier to tie marketing campaigns to specific market segments or even specific individuals. The supplier may, for example, specify criteria determining consumer eligibility for the campaign, thereby limiting efforts to individuals fitting the defined profile, or may segment consumers into categories (based, for example, on individual identity and/or defined behavior patterns) each of which is approached with different offers.

Accordingly, in a first aspect, the invention relates to method of defining and executing a marketing campaign in connection with a site facilitating interactive searches for items characterized by fixed capacity and deferred consumption; site visitors submit preference information relating to consumption and thereby obtain information concerning availability of the items. The method comprises receiving, from each of a plurality of suppliers of the items, (i) a marketing campaign comprising a promotion and execution criteria and (ii) a bid for presentation of the marketing campaign to visitors to the site. The preference information obtained from at least some visitors to the site is assessed for conformance to the execution criteria, and upon detection of a match between a visitor's preference information and the execution criteria of more than one marketing campaign, the visitor is offered one or more of the campaign promotions based at least in part on the bids. For example, promotions may be selected based on a combination of a click-through bid (reflecting how much a supplier is willing to pay to expose a qualifying consumer to a campaign) and a past click-through rate (which reflects the popularity of the supplier's offerings). The execution criteria may specify parameters corresponding to a capacity forecast, and may vary dynamically with an actual and an updated forecast capacity. Alternatively or in addition, the execution criteria specify particular individuals and/or behavior or consumption patterns. Numerous billing arrangements may be made so that the supplier pays based on click-throughs or actual purchase of offered items. The method may be implemented by executable instructions stored on a computer-readable medium.

In a second aspect, the invention relates to a system for defining and executing a marketing campaign in connection with a site facilitating interactive searches for items characterized by fixed capacity and deferred consumption; site visitors submit preference information relating to consumption and thereby obtain information concerning availability of the items. The system comprises a database for storing entries characterizing marketing campaigns each comprising a promotion and execution criteria, relating each marketing campaign to a supplier of the items, and associating with each supplier a bid for presentation of the corresponding marketing campaign to visitors to the site. An execution module assesses the preference information obtained from at least some visitors to the site for conformance to the execution criteria, and upon detection of a match between a visitor's preference information and the execution criteria of more than one marketing campaign, offers to the visitor one or more promotions based at least in part on the bids.

In a third aspect, the invention relates to method of defining and executing a marketing campaign in connection with a site facilitating interactive searches for items characterized by fixed capacity and deferred consumption; site visitors submit preference information relating to consumption and thereby obtain information concerning availability of the items. The method comprises receiving, from each of a plurality of suppliers of the items, a marketing campaign comprising a promotion and execution criteria relating thereto. The execution criteria are dynamically updated based on parameters corresponding to a capacity forecast, and preference information obtained from at least some visitors to the site is assessed for conformance to the updated execution criteria. Upon detection of a match between a visitor's preference information and the execution criteria of more than one marketing campaign, the visitor is offered one or more promotions.

In a fourth aspect, the invention relates to a system for defining and executing a marketing campaign in connection with a site facilitating interactive searches for items characterized by fixed capacity and deferred consumption; site visitors submit preference information relating to consumption and thereby obtain information concerning availability of the items. The system comprises a database for storing entries characterizing marketing campaigns each comprising a promotion and execution criteria and relating each marketing campaign is related to a supplier of the items. An execution module dynamically updates the execution criteria based on parameters corresponding to a capacity forecast. The execution module assesses the preference information obtained from at least some visitors to the site for conformance to the updated execution criteria, and upon detection of a match between a visitor's preference information and the execution criteria of more than one marketing campaign, offers to the visitor one or more promotions.

BRIEF DESCRIPTION OF THE DRAWINGS

The foregoing discussion will be understood more readily from the following detailed description of the invention, when taken in conjunction with the accompanying drawings, in which:

FIG. 3 illustrates a representative user interface by means of which a marketer can enter campaign parameters.

DETAILED DESCRIPTION OF THE PREFERRED EMBODIMENTS

1. A Representative Travel Site

Figure 1:
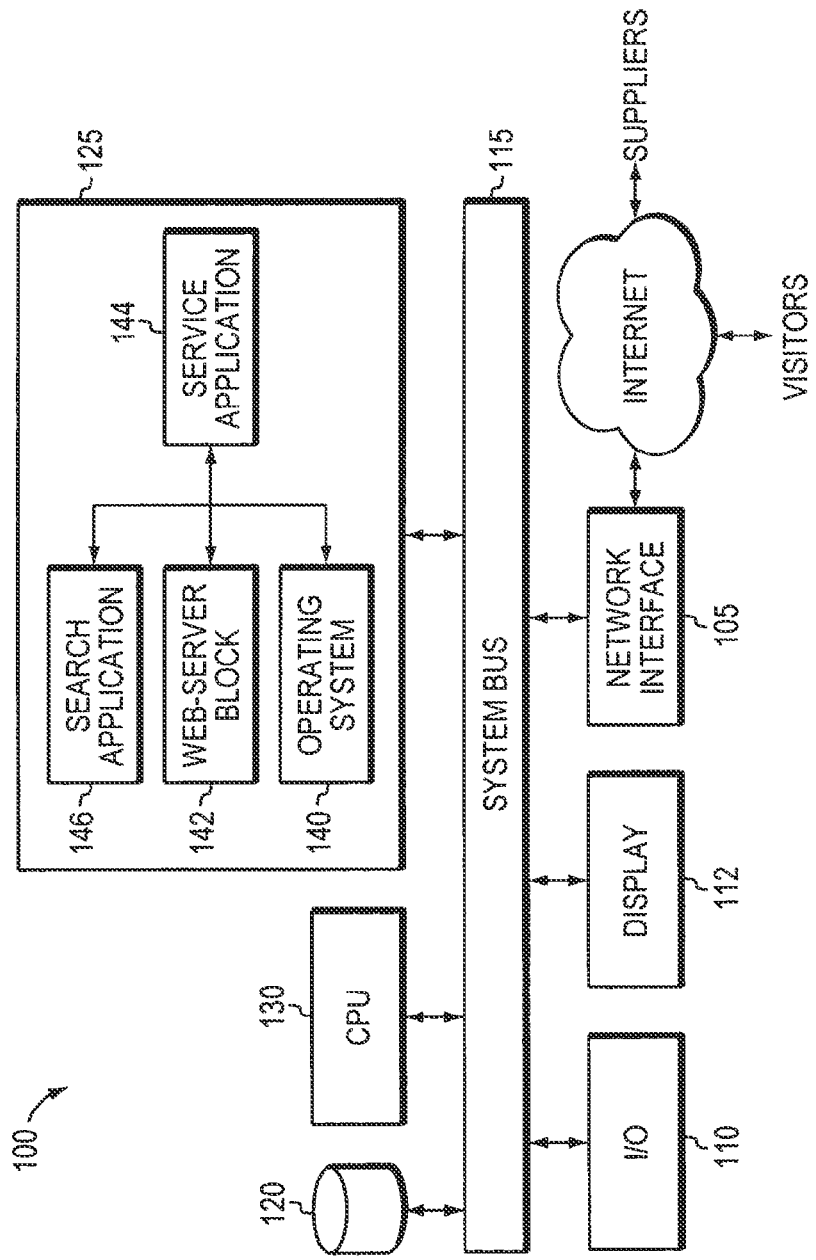
FIG. 1 is a block diagram illustrating a conventional web server to which the present invention may be applied.

Refer first to FIG. 1, which illustrates, in block-diagram form, a server 100 implementing a travel site useful in conjunction with the invention. (As used herein, the term "site" refers to any interactive product, site or area, including but not limited to a site on the World Wide Web portion of the Internet (a "website"). As indicated in the figure, the server 100 includes a network interface 105, which enables the server 100 to interact, via a computer network (typically the Internet), with visitors to the site as well as suppliers (hotels, airlines, etc.) whose products and services are featured thereon. The site manager interacts with the server 100 by means of input/output devices 110 (a keyboard, a mouse or other position-sensing device, etc.) and a screen display 112. The system further includes a bidirectional system bus 115, over which the system components communicate, a non-volatile mass storage device (such as one or more hard disks and/or optical storage units) 120, and a main (typically volatile) system memory 125. The operation of the server 100 is directed by a central-processing unit ("CPU") 130.

The main memory 125 contains instructions, conceptually illustrated as a group of modules, that control the operation of CPU 130 and its interaction with the other hardware components. An operating system 140 directs the execution of low-level, basic system functions such as memory allocation, file management and operation of mass storage devices 120. At a higher level, a web-server block 142 implementing HTTP handles requests for the web pages that will be transmitted, via network interface 105, to site visitors. The form and content of the web pages are determined by a service application 144, which carries out the basic operations that characterize interactions with site visitors. Web pages served to a visitor may prompt action by and receive information from the visitor; such information is transmitted back to the server 100. Much of the information supplied by a site visitor is utilized by a search application 146, which performs searches for the products and/or services requested by a site visitor.

In operation, suppliers of travel-related products and services may sign up with the proprietor of server 100 and provide reference web pages that illustrate offering attributes—e.g., in the case of a hotel, rooms and amenities. These are stored in mass storage 120. When a consumer visits the site, he may specify, via web pages served via service application 144 and web-server block 142, criteria relating to an upcoming trip—e.g., the location and dates of his expected stay, along with price constraints. These criteria are utilized by search application 146 to perform a search, via the Internet, of supplier sites (and possibly travel meta-sites) for airlines and hotels with offerings that conform to the visitor's requirements. Search results are assembled into a web page by service application 144. In general, the served web page takes the form of a list, showing various offerings consistent with the visitor's specified criteria as well as their characteristics. In addition, for offerings provided by suppliers that have partnership arrangements with the travel site, the served web page may contain links to pages (stored either in devices 120 or at the supplier's site) describing the offering in greater detail. On the visitor side, the travel site may allow consumers to sign up as members and, following log-in, permit posting of comments and/or pictures onto web pages set up by (or for) suppliers. In this way, visitors obtain a sense of participation by contributing to the information content of the travel site, and benefit from observations posted by others. Moreover, the sign-up process can involve provision by a consumer of information that may be specified by a marketer in connection with a bid as described herein. For example, consumers signing up with the travel site may be asked to provide generic demographic (e.g., age range, gender, state of residence), financial and/or preference information that may be utilized as targeting information to a marketer. A profile including this information is created for the consumer and stored in a database on a device 120, and this profile, along with the constraints specified by the visitor in connection with a particular planned trip, can be searched for matches to criteria supplied by marketers in connection with their campaigns.

2. A Representative Implementation of the Invention

Figure 2:
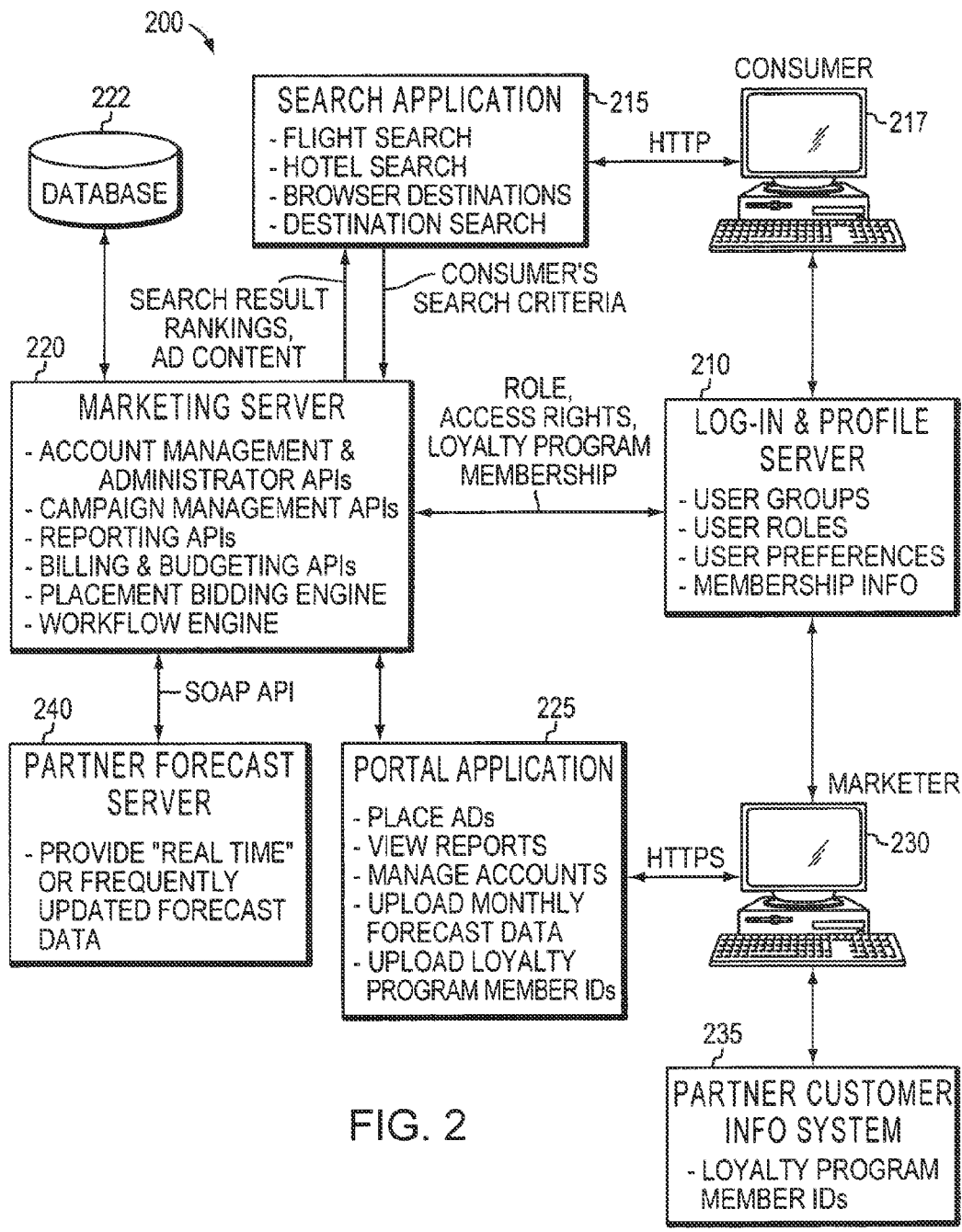
FIG. 2 is a block diagram illustrating the components of an implementation of the invention.

FIG. 2 illustrates a system 200 implementing the invention in the context of a travel site.

The log-in and profile server 210 corresponds, in general architecture and function, to server 100 described above. Similarly, the search application 215 corresponds to application 146 shown in FIG. 1. It is shown in FIG. 2 as a separate element not only to better convey the operational flow associated with the illustrated system, but also because it is not necessary to have application 215 resident as a running process on server 210; rather, search and log-in functionality can be distributed among physical or logical servers as desired. The consumer, accessing log-in and search functions from a client machine 217 via the Internet, need not be aware that she is receiving web pages from different sources; her experience is of a single interaction.

A marketing server 220 stores and manages marketing campaigns. In general, this server (which, again, has the basic components illustrated in FIG. 1) provides functionality to support the definition of campaigns, their triggering or execution criteria—i.e., the information which, when matched to that supplied by a consumer visiting the site, causes placement of a bid for campaign access to that consumer, and which is typically stored along with data defining the campaign itself in database 222—as well as accounting and reporting routines. These may be implemented as executable programs or as application program interfaces (APIs), which allow those accessing the server to define the characteristics and capabilities of these functions. The marketing server 220 also includes executable instructions defining a placement bidding engine, which assesses bids and identifies "winning" campaigns, and a workflow engine, which among other things handles placement of campaigns to consumers visiting the travel site. The consumer, in other words, furnishes search criteria to search application 215, and log-in server 210 also maintains information about the consumer that may be relevant to campaign execution criteria. When the consumer executes a search via search application 215, all of this information is made available to marketing server 220, which searches database 222 for campaigns having execution criteria matching the consumer's search and/or profile information.

The profile information relevant to a marketing campaign can take many forms. Most simply, it not used at all; a marketer may be interested only in, for example, a consumer's dates of travel rather than information about the consumer himself. In this case the only parameters relevant to bidding of a campaign are the search criteria, and the consumer's profile is not considered. More typically, marketers target their campaigns based, at least in part, on general demographic information. A marketer may even target specific consumers, who can be identified by member IDs in a loyalty program run by the marketer's company (sometimes herein referred to as a "partner" to denote a business relationship between the marketer's company and the travel site). In any case, when a search is performed, log-in server 210 sends data representative of the consumer's profile to marketing server 220, which applies this information as appropriate along with the search parameters to the execution criteria of campaigns stored in database 222.

Marketers define campaigns and otherwise interact with marketing server 220 by means of a portal application 225. This application allows a marketer, working at a client machine 230, to communicate securely with the host of portal application 225 in order to define campaigns, view reports relevant to her account, provide data (e.g., forecast data) relevant to execution of campaigns, and supply identifiers for specific consumers to whom she wishes to target a campaign. Again, these identifiers may be in the form of loyalty-program member IDs, which the marketer may obtain from a separate loyalty server 235. Once again, portal application 225 may be implemented as a running process marketing server 220, or may reside on a separate server. Moreover, the functions provided by marketing server 220 and log-in server 210, as well as the search and portal applications 215, 225, may be implemented on a single server or multiple physical or logical servers.

As further explained below, a marketer's company may have sophisticated forecasting tools in place. Marketing server 220 may be configured for direct communication with forecast servers 240.

3. Campaign Definition Management and Placement

Implementations of the present invention utilize system functionality that differs from conventional search marketing tools. In particular:

"Consumption Date Targeting" allows marketers to specify the consumption dates as a campaign execution parameter. This parameter restricts the display of the marketing campaign to those consumers whose anticipated consumption of the service matches the marketer's target consumption pattern. As a concrete example, a hotel marketer may, via portal application 225, specify certain stay dates (e.g., weekend nights in February, March, and April) for a campaign that offers an upgraded room at no charge. Given the "stay date" campaign parameter, the upgraded room offer is only displayed to consumers who plan to stay on those dates.

"Capacity Utilization Targeting" enables marketers to integrate forecasting systems 240 as part of their campaign creation. Supplier forecasting systems use different methods (e.g., extrapolation of comparison current booking trends against historical booking trends) to estimate demand and capacity utilization in the future. Using the present invention, marketers write campaign targeting rules against the results of these forecasting systems. For example, a hotel forecasting system may predict hotel occupancy on a rolling 90-day basis. Using portal 225, a marketer may construct a campaign with the following parameters: "pay up to $0.75 per click when occupancy is less than 60% and pay up to $0.50 per click when occupancy is less than 80%." While this functionality is related to consumption date targeting, it provides additional value because the occupancy forecast is dynamic. As the hotel gathers more information about future capacity utilization (i.e., guests make or cancel reservations), this information, in turn, affects the execution of a marketing campaign in accordance with user-defined rules.

"Individual Customer Targeting" permits marketers to develop campaigns that target individual guests. As noted, marketers can develop unique customer lists for a campaign. As an example, an airline may comb through its frequent-flier database to identify a list of 200 members who will be eligible for an offer of "triple miles when booking business class." This group of travelers and their frequent-flier numbers are uploaded to marketing server 220 and serve as a campaign parameter. As consumers navigate and use the travel site (i.e., server 210 and search application 215), they provide information about themselves, such as frequent-flier numbers, through their customer profiles. The campaign is only invoked when a consumer matching the campaign criteria is present.

Figure 3:
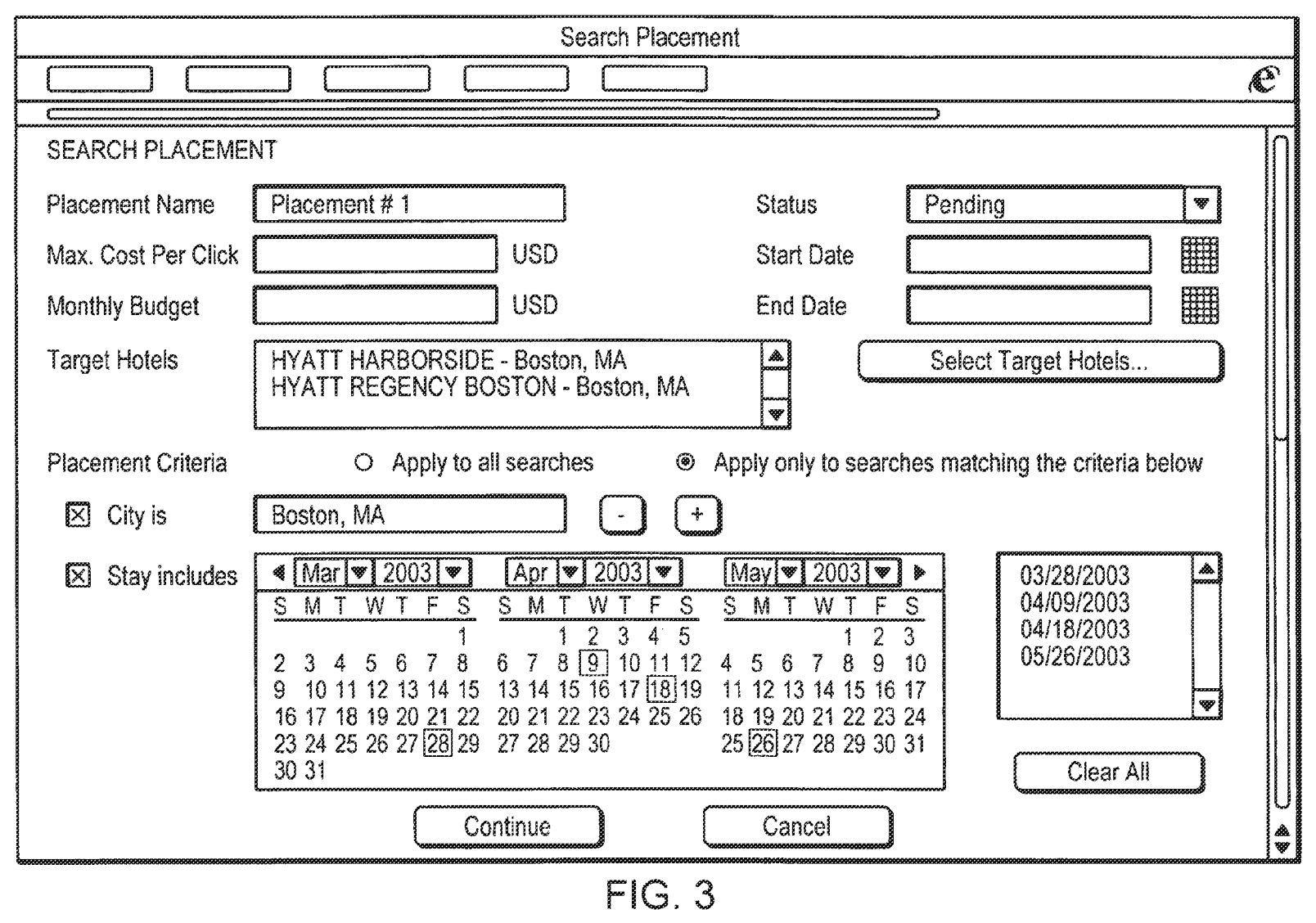

FIG. 3 illustrates a representative user interface presented by portal application 225, and by means of which a marketer defines, via the web, a campaign and its basic parameters. The marketer first names the campaign ("placement name") and enters both a maximum bid (i.e., a cost per click, or "CPC") and a maximum monthly budget (which limits the number of monthly click-throughs given the maximum CPC), as well as start and end dates for the campaign. The marketer selects target hotels, which are the subject of the illustrated campaign, from database 222; in other words, portal application 225 accommodates marketers who represent more than a single partner company. The marketer may also enter placement criteria specifying characteristics of the consumers to whom the campaign will be targeted. In the depicted screen, the criteria that may be specified include the city to which a visitor to the site plans to travel, and a date span, relevant to the marketer (involving a low-utilization period), that must match the visitor's travel plans.

Additional campaign parameters within the marketer's control and definable via other screens provided by portal application 225 include the following:

(a) Placement Types (Ad Units)—the invention facilitates development of marketing campaigns for defined "Placement Types." A Placement Type defines the screen location where the promotional campaign will be presented to the consumer following a search (e.g., the right rail of the page showing hotel or airline flight search results). Placement Types may specify or constrain the types of offers, segmentation, and merchandising material associated with them, and typically are subject to different pricing or represent a parameter upon which marketers may bid. Representative Placement Types include:

Search Placement—A competitively bid placement for higher positioning in a search-result list for specific individual products (e.g., a specific hotel property or properties).

Booking Option Placement—A placement for including a booking agent in the direct booking options offered to travelers.

Booking Message Placement—A placement for including a marketing message with a booking link offered to travelers.

Opaque Placement—A placement added to a search result screen from an "opaque" (i.e., hidden) partner that is visually highlighted as a different class of result. It must match the visitor's current search criteria, be a specifically priced offer, be available for booking and provide incremental value over comparable items in the standard search results (e.g., an offer for a room in a four-star hotel that is cheaper than any standard four-star result).

Sponsored Link (Side Ad) Placement—A competitively bid placement of an advertisement as supplemental page content (e.g., a Google-style, side-bar advertisement) that is specific to the current search context, user profile and/or page content (keyword matching).

Upsell Placement—A placement that associates an offering from another, "upsell" partner, e.g., a specific, dynamic "Air+Hotel" package with every individual flight search result (if such a package is available from an upsell partner). Initial integration is generally with a single upsell partner; additional upsell partners can, however, be supported for slots not filled by the primary partner or to rotate in as the primary upsell partner.

Alternative Hotel Placement—A placement that allows the marketer to identify similar hotels to the hotel that has been selected.

Featured Supplier Placement—A placement that features search results from a single, specific supplier or brand. The featured results are displayed on the same page as standard hotel results but are visually highlighted as a different class of result.

Non-native Search Placements—A placement may be on a third-party site or network beyond the travel site.

(b) Segmentation Criteria—The invention allows a marketer to segment the consumer audience for purposes of defining target classes of consumer for different campaigns. This segmentation is possible because of the information gathered by marketing server 220 about the consumer and his or her consumption patterns prior to selecting a marketing campaign. Segmentation criteria may include:

Guest Stay or Travel Dates—For a hotel, this is the arrival date and length of stay at a property. Likewise, a car rental company is interested in the dates that the guest plans to rent the car. For an airline, this can be the origination/destination pair.

Forecast Occupancy/Load Factor—For partners that have built interfaces between their forecasting system 240 and marketing server 220, campaigns can be segmented based on forecast occupancy, load factor, or other measures of capacity utilization. For these campaigns, the marketer defines capacity utilization conditions (e.g., less than 80%) when the promotion is to be available. The marketer's server 240 then determines the availability of the campaign at any given point in time.

Search Dates—This refers to the dates on which the guest is conducting a search.

Star/Service Level—This refers to the service level requested by the guest. For an airline, this may be "non-stop flights." For a hotel, this may be "four-star hotels."

Cabin/Room Class—This refers to the level of service the guest wishes to purchase. For an airline, this may refer to coach, business, or first class. For a hotel purchase, a guest might select from standard rooms and suites. For cars, a consumer might distinguish between economy and premium cars.

Price range—This refers to the amount of money the guest will pay for a service. A marketer may, for example, restrict a campaign to consumers specifying a price range that exceeds the supplier's offer price.

Number of guests/travelers

Number of rooms/seats

Proximity to a location—A campaign may be targeted to guests who are searching for a specific location or point of interest (e.g., the Empire State Building).

Keyword—Keywords are other descriptive attributes the guest may use to target a campaign. Examples include beach, tennis, ski, resort.

Unique Consumer Identifier—As previously noted, some campaigns are targeted to a specific consumer or consumers. This segmentation approach requires the marketer to develop a list of target consumers and the unique identifiers for those consumers (e.g., loyalty program number, credit card, frequent-flier number). These consumer identifiers are then loaded into database 222. When a campaign is invoked, marketing server 220 (via profile server 210) checks against visitor profiles to confirm whether a particular visitor is eligible for the promotion.

(c) Campaign Collateral and Merchandising—A campaign can include collateral and merchandising elements. These elements allow the marketer to display a unique offer, present a more compelling version of its product, and/or increase the prominence of its products on the page. Typical campaign collateral elements include:

Sort Order Control—A campaign may control the order in which results are displayed.

Text Placement—The text message can be defined by the parameters of the placement. For example, a text placement may be defined as a 50-character string.

Banner Placement—The campaign may include a banner advertisement or other related placement. This can be defined by a number of pixels, based on the space constraints of the page.

Graphics and Images—The campaign may include other logos, graphics or images. Again, these images can be defined in terms of placement dimensions.

Unique Offer Capability—A campaign may allow a marketer to include a unique offer as part of the campaign. The marketer can, for example, provide a link to a landing page, a promotion access code, a "rate access code," a "room type designator," or other indicator to ensure availability and fulfillment of the offer or service associated with this campaign.

External Ad Sales Integration—A placement can integrate advertising from other search marketing companies. For example, the invention can include offers from an outside search engine in the results generated by search application 215.

(d) Campaign Sort Order—A key element of many campaigns is the "sort order" of results. The marketing server 220 manages scarce resources (the limited number of available search placements) against marketer interest (the marketers competing for those placements). To manage this conflict, server 220, in one embodiment, utilizes the following methodology:

The positional rank of a competitively bid placement is a function of the placement's "click-through bid" and its effectiveness (the "click-through rate"). The click-through bid is the amount that a particular marketer is willing to pay for prominent placement of a link; this amount is compared against other marketers' bids in an auction format as explained below, with higher bids being awarded more prominent or desirable positions. The click-through rate reflects the rate at which site visitors actually click on the link to consider the marketer's promotion. This formula rewards suppliers who submit compelling promotional placements and displays to travelers the placements that are most likely to be of interest to them, while limiting consumer exposure to campaigns associated with unpopular suppliers.

For competitively bid placements, the actual cost for a click is the amount necessary to attain the highest position relative to other bidders without exceeding the supplier's maximum CPC bid. When the actual cost is not driven by a competing bid, then a minimum percentage of the CPC bid is used.

(e) Budgeting/Payment—Marketers are provided with the ability to control their bids and pay for their expenditures. Budgeting tools associated offered via portal application 225 desirably include:

A tool to allow budget parameters to be established for a marketing campaign. These include a maximum marketer-specified CPC and a maximum marketer-specified overall campaign monthly budget.

An advanced budgeting tool that allows hotels to vary their maximum CPC for different stay dates within a single defined campaign. This tool allows the marketer to enter different CPCs for each day of the campaign. On the advanced budgeting tool, the marketer is able to see the estimated click-through for each day of the campaign (using the maximum allowed CPC for that day).

A campaign will be invoked (and the marketer's account charged) every time a consumer clicks on a hotel link when the sort order has been affected by the campaign criteria. But if a site visitor re-sorts the results (e.g., by sorting the results by price or proximity to a point of interest) and clicks on a hotel link with an associated campaign, the campaign will not be charged.

An optional monthly spend limit can be set for a placement.

The invention supports a variety of billing models. For the purpose of competitively bid placements, all of these billing models are converted into CPCs using past performance as an assumption:

Cost Per Click (CPC)—This is the primary pricing model in which click-throughs on the buyer's booking link are immediately billable.

Cost Per Booking (CPB)—In this pricing model, clicks that result in completed reservations are recorded as conversions and are billable after the booking has been completed. The CPB rate can be either a flat price per booking or a percentage of the booking revenue or a percentage of revenue with a cap (e.g., 10% up to $20).

Cost Per Acquisition (CPA)—In this pricing model, only clicks that result in consumed reservations are billable but only after the traveler uses the reserved product. The CPA rate can be either a flat price or a percentage of the consumed revenue or a percentage of revenue with a cap (e.g., 10% up to $20).

(f) Campaign Management Features/Metrics and Reporting—Portal application 225 provides marketers with some or all of the following capabilities and information on the impact of their campaigns:

Placements may be temporarily deactivated (paused) by marketers with sufficient access rights.

Placements may be temporarily deactivated (suspended) by an administrator for payment or editorial problems.

Placements may be permanently deactivated (retired) by marketers with sufficient access rights.

Basic Metrics include:

Estimated average ranking—provides the marketer with the average rank of a campaign against the other campaigns that include the same criteria. For campaigns in which the marketer has selected a limited number of dates, the basic estimated average ranking will take the ranking over the stay days requested by the marketer.

Estimated monthly search volume—provides the marketer with the estimated number of searches that will be generated over the next month for the location that has been selected (e.g., there will be 1000 searches for New York in January). This number is typically based on average search volume for the trailing three months times the growth rate for the trailing 45 days.

Estimated monthly clicks—provides the marketer with the number of clicks he can expect from his campaign. To generate this number, the share of clicks associated with each average ranking is tracked. "Monthly clicks" is the estimated market share times the estimated monthly search volume times the estimated click-through from the hotel details page to the hotel page.

Estimated monthly cost—the number of clicks from the search results to the hotel details page times the estimated average cost. This may be based on the average cost per day times the click volume per day, rather than on the maximum CPC for the campaign times the total clicks per month.

Estimated missed clicks—the estimated number of clicks missed because the campaign's budget limit was reached prior to the end of the budget period.

Number of impressions for each placement per budget month (which can be rolled up to the placement's campaign or to the account level).

Number of clicks for each placement per budget month.

Number of conversions (bookings) for each CPB placement per budget month.

Details for each click including date, time, IP address, affiliate information and any other information necessary or useful to measure the effectiveness of the placement.

Details for each conversion recorded including time, date, IP address, booking price, affiliate information and any other information necessary or useful to measure the effectiveness of the CPB placement.

Advanced metrics may provide the marketer with the estimated number of clicks for each day of the campaign. The marketer can then include a conversion rate to estimate the number of reservations it will receive from the campaign.

Campaign planning tools allow marketers to specify a number of clicks or reservations required for a given day (and marketing server 220 will suggest a price that achieves this goal), and to specify a date range and a budget parameter, in which case marketing server 220 identifies the lowest cost days for this campaign.

Emails and messages tell the marketer she is running out of budget, that she has been outbid, and that she is missing demand:

Weekly budget status email covering all of the marketer's campaigns and placements.

An optional alert email to the marketer if/when a placement spends 50% of its budget "ahead of schedule."

An optional alert email to the marketer if/when a placement spends 90% of its budget "ahead of schedule."

An optional alert email to the marketer if/when a placement spends 100% of its budget "ahead of schedule."

An optional email alert when a campaign has been outbid.

An optional email alert when a campaign's average placement has fallen below a target specified by the marketer (e.g., alert me if my average campaign placement falls below 1.5).

An optional email alert when CPC traffic is below some cost specified by the marketer (e.g., tell me what parameters are less than $0.50 CPC)

4. Operational Workflows

Figure 4:
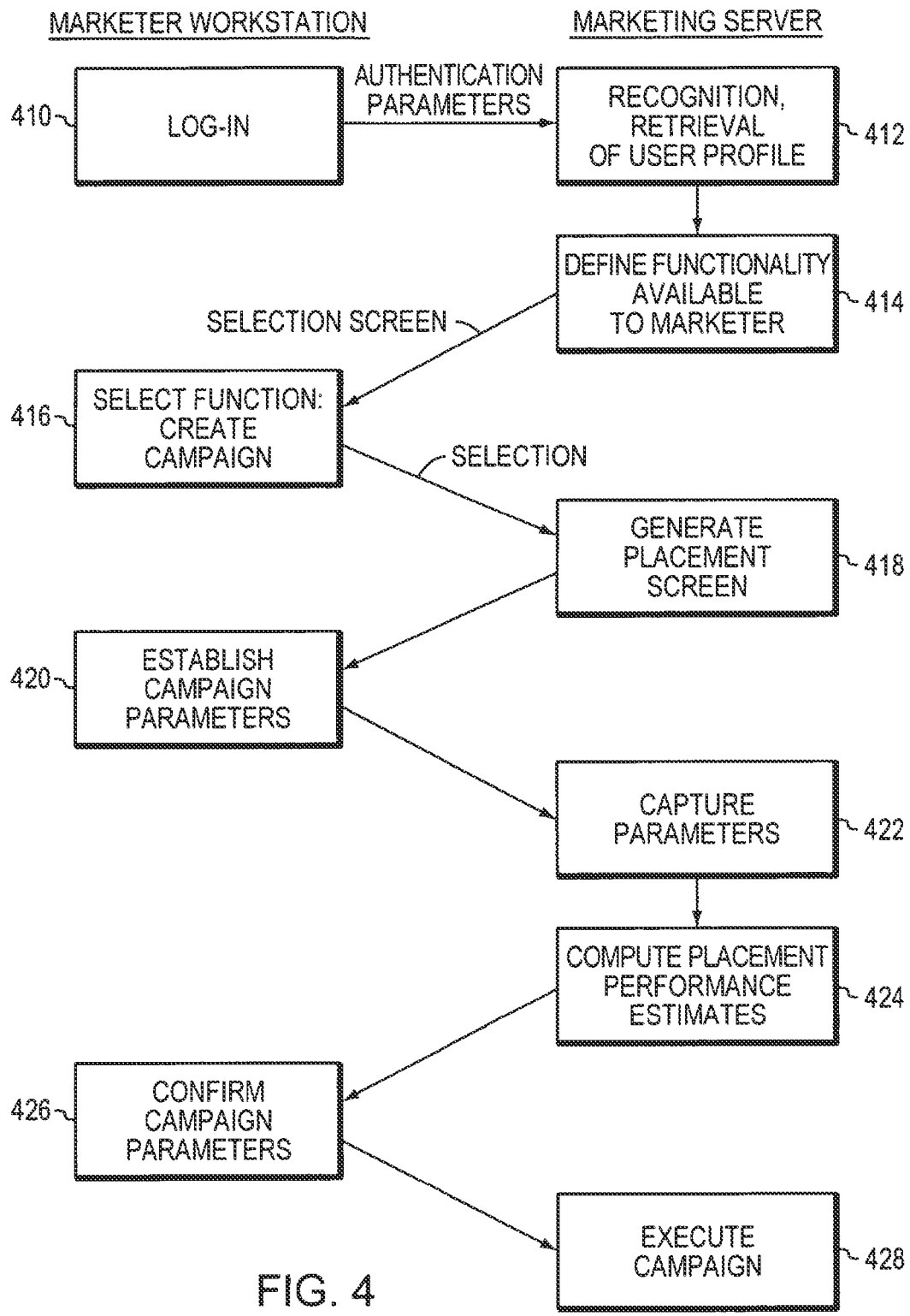
FIGS. 4-6 illustrate workflows representing operation of certain implementations of the invention.
Figure 5:
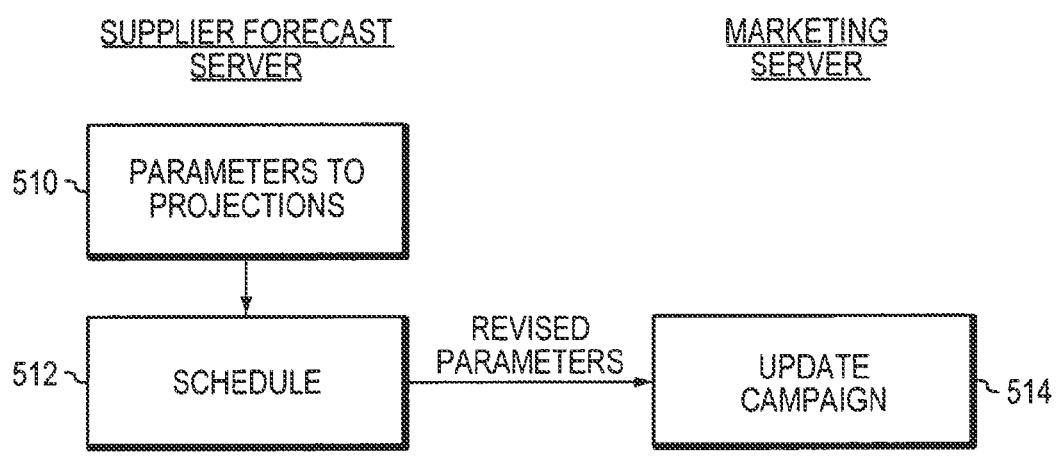
Figure 6:
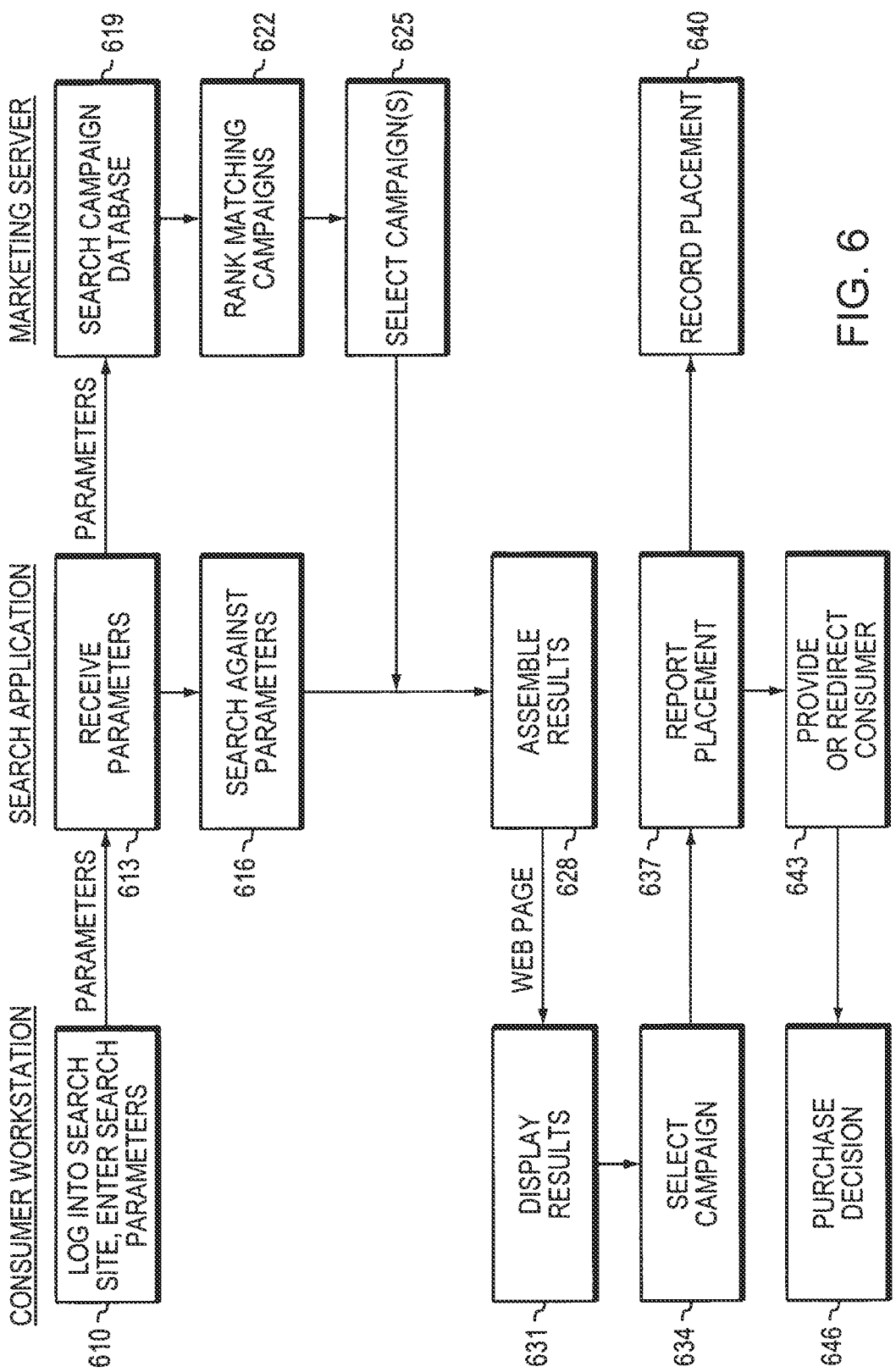

FIGS. 4-6 illustrate typical operational sequences of a representative implementation of the invention. FIG. 4 shows how a marketer, using a workstation communicating with a marketing server in accordance with the invention, develops and causes execution of a marketing campaign. In step 410, the marketer logs into the marketing server, which recognizes the marketer's password or other authentication parameters and retrieves her profile (step 412). Based on this profile, the marketing server determines the functions that should be made available to the marketer (step 414), sending a selection screen that presents the marketer with a set of options (e.g., manage account, create campaign, edit active campaigns, view reports). In this example, the marketer selects the "create campaign" option (step 416). The marketing server receives this selection and, in response, generates HTML markup instructions corresponding to a placement screen (such as that shown in FIG. 3). These markup instructions are transmitted to and displayed on the marketer's workstation. The marketer interacts with the displayed page (in practice, a typical interaction will likely involve more than one displayed page) to establish campaign parameters (step 420). The campaign parameters may include campaign name, maximum CPC, monthly budget, start date, end date, target hotel(s), and dates of interest. By selecting dates, the marketer is requiring prospective guests searches to include these dates. Other campaign types (e.g., a side-rail or booking message campaign) require additional parameters such as placement type (side-rail, booking message, etc.), product type (air, car, hotel, etc.), whether campaign text is to be displayed when the campaign is invoked, campaign collateral (images, banner ads, or logos) that will be displayed when the campaign is invoked, and search-related keywords representing other descriptive attributes that the marketer may wish to target (e.g., if a site visitor enters the term "beach" or "luxury").

The marketing server captures these parameters (step 422) and computes placement performance estimates (step 424). These may include estimated average rank for this campaign (based on the cost/click for this campaign as compared to all other campaigns active at the same time), estimated monthly search volume (the number of searches in which the campaign might be invoked, based on an extrapolation of growth rates and past campaign performance), and estimated monthly clicks (based on the average rank, the number of searches, and the share of searches that go to each rank). In step 426 the user receives these estimates and confirms the campaign parameters; alternatively, the marketer may alter them to repeat steps 420-424 in order to improve the estimates. Upon the marketer's confirmation, the marketing server begins executing the campaign.

As explained above, the campaign criteria are business rules and may be based on the output of a forecasting system, which the supplier uses to estimate capacity utilization in the future. Generally, these are proprietary tools that are managed and optimized by the supplier. As shown in FIG. 5, the forecast server may compute revised projections (step 510) either periodically or in response to events (such as a booking pace that exceeds projections, or cancellations of existing reservations). On a schedule 512 agreed upon by the marketer and the proprietor of the marketing server, the revised projections are passed to the marketing server, which updates campaign parameters (step 514) in accordance with previously agreed-upon business rules associated with the campaign. This approach provides a dynamic feedback loop for the supplier, adjusting the intensity of the campaign in response to its own success and that of other marketing activity.

In some implementations of this approach, additional information from the forecasting system, e.g., the forecast number of reservations for each arrival date and length of stay, is provided. This information is relevant for hotels because managing length of stay allows hotels to manage occupancy by restricting stays from guests who are only interested one-night visits and taking guests with longer stays (that also cover low-occupancy nights). In this alternative, the marketer can add a parameter that restricts the campaign to multiple-night reservations that include the low-occupancy nights.

In some implementations, the campaign criteria include a loyalty program number for the individual guest. Many marketers have extensive customer databases that identify individual customers through a unique identifier (e.g., a frequent-flier number). It is expected that the marketer will mine its customer database to identify target customers for a given campaign. The marketing server provides an interface that allows the marketer to upload a list of loyalty program numbers as a campaign criteria element (FIG. 4, step 420). For these campaigns, the consumer must be logged in, and his or her customer profile must include the appropriate loyalty program number for the campaign to be invoked.

In some implementations, the marketer creates a campaign that includes a unique merchandising offer or some communication to the target audience. In addition to establishing the campaign parameters (FIG. 4, step 420), the marketer also enters the creative and merchandising elements of the campaign. This can include loading images, logos, or text, establishing links to a landing page, embedding an offer identifier in the search parameter, or involve other campaign elements that communicate the offer to the guest and ensure that the offer can be purchased and fulfilled.

FIG. 6 illustrates a generalized workflow depicting interaction with a consumer. With reference to FIG. 6 and also to FIGS. 1 and 2, the consumer first logs into server 210 (step 610). The search application 215, which is in communication with or running on the server 210, receives the consumer's parameters (step 613). These may include, for example, the city to which the consumer plans to travel, the arrival and departure dates, the number of guests travelling, and the number of rooms required. The consumer's search may include other parameters, such as a hotel descriptor (e.g., beach), a service level (e.g., four-star), or a proximity to point of interest (e.g., within four miles of Empire State Building). Any of these may be relevant to execution of a campaign.

The search application sends these parameters to the marketing server 220 and also specifies the number of placements available on the page that will eventually be sent to the consumer with search results. The search application thereupon performs a search for supplier offerings consistent with the consumer's parameters (step 616). The marketing server utilizes the parameters to search the campaign database 222 (step 619) for campaigns having execution criteria matching the parameters. If more than one campaign is identified, the campaigns are ranked (step 622) in terms of position and also placement, and the top-ranked campaign(s) selected (step 625). As explained above, positional ranking can be based on parameters other than or in addition to the click-through bid. To maintain credibility with site visitors and offer them campaigns in which they are likely to have interest, the ranking algorithm may also consider the popularity of the supplier's offerings as measured, for example, by the click-through rate. The number of selected campaigns corresponds to the number of available placements communicated by the search application. Data representing these campaigns, along with data indicating their respective page placements (based on the originators' placement requests and bids), are communicated to the search application.

As a result of its search, the search application accumulates supplier information responsive to the consumer's parameters, and assembles these, along with the campaign data provided by the marketing server, into a web page (step 628) to be transmitted to the consumer's computer via the Internet. (Here, search application 215 is presumed to contain functionality corresponding to service application 144 and web-server block 142; see FIG. 1.) The assembled web page contains the selected promotional campaigns, arranged in accordance with their respective placement assignments, and is displayed (step 631) on the consumer's computer. If a user selects a campaign (step 634), the search application reports the placement to the marketing server (step 637), which records it for billing purposes (step 640). The search application either provides the requested information or redirects the consumer to a site through which he can take advantage of the promotion (step 643). If the user decides to purchase the offering (step 646), this may also be recorded depending on how the marketer is to be billed (e.g., by CPA or CPB).

It will therefore be seen that the foregoing represents a highly extensible and flexible approach to improving capacity utilization through individualized marketing campaigns. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed. For example, the various modules of the invention can be implemented on a general-purpose computer using appropriate software instructions, or as hardware circuits, or as mixed hardware-software combinations. Moreover, although the above-listed text and drawings contain titles and sub-headings, it is to be understood that these title and sub-headings do not, and are not intended to limit the present invention, but rather, they serve merely as titles and headings of convenience.

What is claimed is:

1. A method for executing marketing campaigns, the method executed by a computer system comprising at least one computer, the method comprising:

receiving, via a computer interface provided by at least one computer, information for a marketing campaign associated with a supplier of items, the information for the marketing campaign including a promotion for an item of the supplier and execution criteria defining circumstances under which the promotion should be presented to a user via a computer network site;

receiving, via the computer interface provided by the at least one computer, forecast data for the supplier, the forecast data computed based on future availability of one or more items provided by the supplier;

modifying, by the at least one computer, the execution criteria of the marketing campaign based on the forecast data;

responsive to receiving, from a client device, a request for an item, determining whether conditions associated with the request satisfy the modified execution criteria of the marketing campaign; and responsive to satisfying the modified execution criteria, automatically determining whether to transmit the promotion for presentation on the client device.

2. The method of claim 1, further comprising selecting a promotion from a plurality of promotions of marketing campaigns whose execution criteria is satisfied by conditions associated with the request.

3. The method of claim 1, wherein the forecast data for the supplier is computed periodically by a forecast server and provided by the forecast server for modifying the execution criteria.

4. The method of claim 1, wherein the forecast data for the supplier is computed responsive to an event.

5. The method of claim 4, wherein the event is a booking pace not being in accordance with a booking projection.

6. The method of claim 4, wherein the event is a set number of reservations being canceled.

7. The method of claim 1, wherein the execution criteria includes a set of users for whom the marketing campaign is intended, and wherein the modification of the execution criteria results in a change in the set of users.

8. The method of claim 1, wherein the execution criteria includes behaviors of users for whom the marketing campaign is intended, and wherein the modification of the execution criteria results in a change in the behaviors.

9. A system for executing marketing campaigns, the system comprising:
   at least one processor; and
   a computer-readable storage medium storing computer-executable instructions that when executed by the at least one processor are configured to:
      receive information for a marketing campaign associated with a supplier of items, the information for the marketing campaign including a promotion for an item of the supplier and execution criteria defining circumstances under which the promotion should be presented to a user via a computer network site;
      receive forecast data for the supplier, the forecast data computed based on future availability of one or more items provided by the supplier;
      automatically modify the execution criteria of the marketing campaign based on the forecast data;
      responsive to receiving, from a client device, a request for an item, determine whether conditions associated with the request satisfy the modified execution criteria of the marketing campaign; and
      responsive to satisfying the modified execution criteria, automatically determine whether to transmit the promotion for presentation on the client device.

10. The system of claim 9, wherein the computer-executable instructions when executed by the at least one processor are further configured to select a promotion from a plurality of promotions of marketing campaigns whose execution criteria is satisfied by conditions associated with the request.

11. The system of claim 9, wherein the forecast data for the supplier is computed periodically by a forecast server and provided by the forecast server for modifying the execution criteria.

12. The system of claim 9, wherein the forecast data for the supplier is computed responsive to an event.

13. The system of claim 12, wherein the event is a booking pace not being in accordance with a booking projection.

14. The system of claim 12, wherein the event is a set number of reservations being canceled.

15. The system of claim 9, wherein the execution criteria includes a set of users for whom the marketing campaign is intended, and wherein the modification of the execution criteria results in a change in the set of users.

16. The system of claim 9, wherein the execution criteria includes behaviors of users for whom the marketing campaign is intended, and wherein the modification of the execution criteria results in a change in the behaviors.

17. A computer program product having at least one non-transitory computer-readable storage medium having computer-executable instructions for executing marketing campaigns, the computer-executable instructions when executed by at least one processor configured to perform a method comprising:
   receiving information for a marketing campaign associated with a supplier of items, the information for the marketing campaign including a promotion for an item of the supplier and execution criteria defining circumstances under which the promotion should be presented to a user via a computer network site;
   receiving forecast data for the supplier, the forecast data computed based on future availability of one or more items provided by the supplier;
   automatically modifying the execution criteria of the marketing campaign based on the forecast data;
   responsive to receiving, from a client device, a request for an item, determine whether conditions associated with the request satisfy the modified execution criteria of the marketing campaign; and
   responsive to satisfying the modified execution criteria, automatically determine whether to transmit the promotion for presentation on the client device.

18. The computer program product of claim 17, wherein the computer executable instructions when executed by the at least one processor are further configured to select a promotion from a plurality of promotions of marketing campaigns whose execution criteria is satisfied by conditions associated with the request.

19. The computer program product of claim 17, wherein the execution criteria includes a set of users for whom the marketing campaign is intended, and wherein the modification of the execution criteria results in a change in the set of users.

20. The computer program product of claim 17, wherein the execution criteria includes behaviors of users for whom the marketing campaign is intended, and wherein the modification of the execution criteria results in a change in the behaviors.

* * * * *